(12) United States Patent
Manewald et al.

(10) Patent No.: US 12,459,599 B2
(45) Date of Patent: Nov. 4, 2025

(54) CONTROL SYSTEM FOR AN ELECTRIC BICYCLE

(71) Applicant: Robert Bosch GmbH, Stuttgart (DE)

(72) Inventors: Merlin Martin Manewald, Reutlingen (DE); Sebastian Eberle, Tuebingen (DE); Christoph Schumacher, Dusslingen (DE); Christian Reisige, Tuebingen (DE); Matthias Weinmann, Balingen (DE); Stefan Kuttler, Dusslingen (DE); Benjamin Koenig, Wendlingen (DE); Daniel Baumgaertner, Neustetten (DE); Jochen Mueller, Zimmern (DE)

(73) Assignee: Robert Bosch GmbH, Stuttgart (DE)

( * ) Notice: Subject to any disclaimer, the term of this patent is extended or adjusted under 35 U.S.C. 154(b) by 90 days.

(21) Appl. No.: 18/686,414

(22) PCT Filed: Aug. 4, 2022

(86) PCT No.: PCT/EP2022/071942
§ 371 (c)(1),
(2) Date: Feb. 24, 2024

(87) PCT Pub. No.: WO2023/025563
PCT Pub. Date: Mar. 2, 2023

(65) Prior Publication Data
US 2025/0249978 A1   Aug. 7, 2025

(30) Foreign Application Priority Data

Aug. 25, 2021   (DE) .................... 10 2021 209 317.5
May 6, 2022   (DE) .................... 10 2022 204 483.5

(51) Int. Cl.
*B62M 6/45*   (2010.01)

(52) U.S. Cl.
CPC .................... *B62M 6/45* (2013.01)

(58) Field of Classification Search
CPC .......... B62M 6/45; B62M 6/50; B62M 25/08; G07C 5/008; B62J 45/20; B62J 45/411;
(Continued)

(56) References Cited

U.S. PATENT DOCUMENTS 6,684,971 B2 * 2/2004 Yu ........................... B60L 50/20
                                                        180/206.3
12,162,555 B2 * 12/2024 Silsby ...................... B62J 50/22
(Continued)

FOREIGN PATENT DOCUMENTS

DE   202019101294 U1   4/2019
DE   102019106585 A1   9/2019
DE   102020204201 A1   3/2021

OTHER PUBLICATIONS

Robert Bosch GmbH, "Nyon Betriebsanleitung", Online-Version, Bosch eBike Systems, Jul. 28, 2016, 71 pages, 1 270 020 Wde, https://www.bosch-ebike.com/de/service/downloads, Reutingen, Germany.

(Continued)

*Primary Examiner* — Andrew Joseph Rudy
(74) *Attorney, Agent, or Firm* — Maginot, Moore & Beck LLP

(57) ABSTRACT

A control system for an electric bicycle includes an operating unit which is configured to control a ride controller of the electric bicycle. The operating unit is configured to allow a user to select among a plurality of assistance modes via an operating interface, and to control the ride controller in such a way that a drive control for a motor of the bicycle is carried out according to the selected assistance mode.

20 Claims, 6 Drawing Sheets

(58) Field of Classification Search
CPC .... B62J 45/413; B62J 45/414; B62J 45/4151;
B62J 50/22
USPC .......................................................... 701/22
See application file for complete search history.

(56) References Cited

U.S. PATENT DOCUMENTS

| | | | |
|---|---|---|---|
| 12,344,349 B2* | 7/2025 | Reisige | ................. B62M 25/08 |
| 2017/0334514 A1* | 11/2017 | Chen | ........................ B62M 6/55 |
| 2024/0359770 A1* | 10/2024 | Wilms | .................... B62M 6/50 |

OTHER PUBLICATIONS

Robert Bosch GmbH, "Nyon operating instructions", Online Version, Bosch eBike Systems, May 13, 2016, 63 pages, 1 270 020 Wen, https://www.bosch-ebike.com/fileadmin/EBC/Service/Downloads/Bedienungsanleitungen/MY2016/Bosch-eBike-Nyon-User-Manual-2016-EN.pdf, Reutingen, Germany.
International Search Report corresponding to PCT Application No. PCT/EP2022/071942, mailed Dec. 2, 2022. (German and English language document). (5 pages).

\* cited by examiner

CONTROL SYSTEM FOR AN ELECTRIC BICYCLE

This application is a 35 U.S.C. § 371 National Stage Application of PCT/EP2022/071942, filed on Aug. 4, 2022, which claims the benefit of priority to (i) Serial No. DE 10 2021 209 317.5, filed on Aug. 25, 2021 in Germany, and (ii) Serial No. DE 10 2022 204 483.5, filed on May 6, 2022 in Germany, the disclosures of which are incorporated herein by reference in their entirety.

BACKGROUND

The present disclosure relates to a control system for an electric bicycle.

Current electric bicycles typically provide a user with several different assistance modes, which can be selected by the user. However, the potential of different assistance modes is only utilized to a limited extent.

The present disclosure discloses a control system which is intended to provide improved assistance to a user of an electric bicycle.

SUMMARY

The control system according to the disclosure for an electric bicycle comprises an operating unit which is configured to control a ride controller of the electric bicycle, wherein the operating unit is configured to enable a user to select between several assistance modes via an operating interface, and to control the ride controller in such a way that a drive control for a motor of the bicycle takes place in accordance with the selected assistance mode.

The drive control is a control system that controls those components of the bicycle that affect the propulsion of the bicycle. In particular, the ride controller provided by the drive controller is used to control a motor and/or a brake system of the bicycle.

In particular, the drive control is based on a set of drive parameters, i.e., values for certain drive parameters. A set of drive parameters is assigned to each assistance mode. If several different assistance modes are provided by the control system, a set of drive parameters is stored for each assistance mode. Assistance mode is also known as assist mode. Examples of assistance modes are ECO, Tour, Sport and Turbo.

A drive parameter is a parameter that is used directly or indirectly for drive control. A drive parameter is not necessarily a controlled variable or a value for a controlled physical variable. A drive parameter is a parameter that is stored to determine the behavior of the drive control and is used, for example, to determine control variables such as the supply voltage or current of the motor. The drive parameters are preferably configurable by a user.

The control system for the electric bicycle is not necessarily located entirely on the electric bicycle and may consist of several components.

In particular, the operating interface is a user interface provided by the control unit that allows a user to select from already configured assistance modes while driving. In particular, the user interface includes a display or a color indicator to provide the user with information. For example, a selected assistance mode is indicated by displaying a specific color associated with the assistance mode.

The control unit is, in particular, a unit intended for arrangement on a handlebar of the bicycle. However, individual components of the control unit can also be located elsewhere on the bicycle, with only one display being located on the handlebars. Optionally, the operating unit can be provided by a mobile device, such as a smartphone or tablet. The operating interface is preferably provided by means of an app on the mobile device.

Preferred embodiments of the disclosure are set forth below.

Preferably, the control system comprises a configuration interface that allows a user to modify drive parameters and/or create or add new assistance modes. In particular, the configuration interface is provided by the control unit together with the operating interface. Alternatively, the configuration interface is provided by a separate configuration device, such as a smartphone or tablet.

Preferably, the control unit is configured to calculate a key figure for each assistance mode by means of a key figure calculation rule based on the drive parameters stored for the respective assistance mode and to sort the assistance modes based on the key figures calculated for the assistance modes. Alternatively or additionally, the operating unit is configured to provide the drive parameters stored for the respective assistance mode for each assistance mode via an interface, to receive a key figure via the interface and to sort the assistance modes based on the key figures received for the assistance modes.

The assistance modes are sorted in particular when displayed in the user interface. The assistance modes are sorted in particular to create a sequence for changing assistance modes while riding. For example, a predefined button always selects the next most powerful assistance mode for riding. Another button is used to select the next weaker assistance mode. The sorting determines which is the next strongest and next weakest assistance mode.

Alternatively or additionally, the assistance modes are sorted when displayed in the configuration interface based on the key figures calculated or received for the assistance modes. The strength of the respective assistance mode is calculated offline, cloud-based or embedded. In particular, the key figure calculation rule defines a model by means of which a drive system of the bicycle is represented. The model is used to calculate key figures that are ultimately used for sorting.

In the case of electric bikes, the standard assistance modes are pre-sorted according to a fixed order, which is specified by the respective bicycle or motor manufacturers. However, if the assistance modes can be modified by one or more users, the operating interface or the configuration interface must be controlled accordingly by a control system in order to display these assistance modes sensibly and intuitively. In particular, the operating unit must be able to cope with a mixture of manufacturer, OEM and user modes.

The control system, in particular the control unit, preferably stores a large number of assistance modes with associated drive parameters. However, only a proportion of the assistance modes are active and are made available to the user for selection via the user interface. This is taken into account when sorting the assistance modes.

The key figure calculation rule is in particular a calculation rule defined by one or more formulas, by which certain parameters, in particular drive parameters, of an assistance mode are combined in order to obtain the key figure as a result. The key figure is calculated internally via the control system or is performed externally, wherein the parameters required for such a calculation are provided by the control system via an interface. The interface is in particular an interface to a telecommunications network and/or a radio interface. The determined key figures preferably make it possible to determine a parameter that represents the strength of an assistance mode. This allows several assistance modes to be sorted according to the strength specified by the parameter.

Preferably, the key figure is calculated according to the key figure calculation rule from a maximum torque stored for the associated assistance mode and/or an assistance factor stored for the associated assistance mode. These stored values have a particularly large influence on the behavior of an assistance mode, which is perceived as a strength by the user. These values are therefore also particularly suitable for determining a key figure that reflects the strength of an assistance mode.

It is advantageous if the maximum torque and/or the assistance factor for calculating the key figure for each of the assistance modes are determined for a common operating point, the common operating point preferably being defined by one or more of the following variables: a cadence, a rider's torque, a speed. The operating point is therefore the same for each of the assistance modes, which means that the key figures determined are comparable. This is advantageous because the maximum torque and the assistance factor can depend on the operating state of the bicycle. For example, the assistance factor and the maximum torque are speed-dependent. In order to achieve comparability, it is advantageous to define the operating point using a specific speed. The operating point can be defined by several values that are suitable for describing an operating state of the bicycle. For example, the operating point is defined by a combination of values for a speed, a rider's torque, an acceleration, a rotational speed, etc.

It is advantageous if a user's preferred values for cadence, rider's torque and speed are determined to determine the operating point, and/or the operating point is selected depending on the type of electric bicycle. Preferably, the control system is configured to determine the preferred values from the user's driving behavior and to select the operating point accordingly. Alternatively or additionally, the operating point is selected depending on a type of electric bicycle, wherein the selection of the operating point is preferably carried out by the control system. Preferably, the control system is configured to display an indicator in the user interface and/or the configuration interface, which indicates whether an assistance mode can be modified by a user. In this way, a user can be given a quick overview of whether optimization of an assistance mode is possible.

Preferably, the control unit is configured to detect a distance traveled by a user on the bicycle and to provide a specific assistance mode for selection only when a defined minimum distance has been traveled. For example, a distance traveled by the bicycle is recorded from a predefined point in time, for example from the first startup. The distance covered by the bicycle is compared with a predefined threshold value and if this is exceeded, an additional assistance mode is activated. Optionally, a limitation is removed when configuring existing assistance modes if the defined minimum distance has been covered. This makes it possible for certain functions of the bicycle to be made available to the user only after a predetermined period of time, especially when the user has gained sufficient experience with the bicycle.

It is also advantageous if the control system provides a mode in which a limitation of a possible selection from the assistance modes is made via the operating interface for predefined route sections. Such a mode can be referred to as competition mode. When the mode is started, the user is given the assistance mode to be used. This ensures that a specific assistance mode must be used when riding the predefined section of the route if it is to be ridden in competition mode. This means that comparable times can be achieved when different users ride the predefined section of the route, allowing a comparison of the physical fitness of different users.

The route sections, i.e., one or more sections of a route, and the assistance mode associated with each route section are preferably configured by a user via a configuration interface of an online platform and transferred to the control system or several control systems of different bicycles via an interface. Alternatively, the route sections and the assistance mode associated with each route section are configured via the configuration interface of the control system.

It is advantageous if a user can predefine several route sections and thus segments of a route and store them on the control system. It is advantageous if an associated assistance mode is assigned to each segment. If the route is traveled by a user, the assistance mode selected for assistance is preferably changed automatically by the control system so that each section of the route is traveled with the assigned assistance mode. Alternatively, the user is shown that the assistance mode for a segment needs to be changed in order to achieve a comparison with other users.

Preferably, a variable assistance mode can be defined for a section of the route, wherein, for example, a degree of assistance varies over a distance or a time. If the assistance mode is provided by the ride controller, the degree of assistance is provided depending on a determined position or time. For example, it is possible to configure a degree of assistance to be continuously reduced after entering a section of the route.

A provided motor power is preferably fixed in the competition mode. This ensures that every user receives the same level of assistance from the motor.

Furthermore, it is advantageous if each of the assistance modes is identified by an associated color when displayed via the operating interface, wherein the operating unit is configured to calculate a color code describing the color for an assistance mode, wherein the color code is calculated from the drive parameters stored for this assistance mode by means of a color calculation rule. The color code is a digital code that is provided to a rider in order to control a display element, for example an LED or a display of the user interface, to display the color associated with the color code. In particular, the color code describes the brightness and/or hue of the color. Preferably, a color code is calculated for each assistance mode that can be selected via the user interface using the color calculation rule. This means that an individual color can be displayed for each of the assistance modes, allowing different assistance modes to be distinguished by color alone.

The color calculation rule is preferably selected so that a certain shade of the color described by the color code is displayed more intensively for certain properties of an assistance mode. For example, the red color component in the color described by the color code increases at a higher dynamic range.

Preferably, the color calculation rule comprises a plurality of individual sub-calculation rules, wherein each of the sub-calculation rules is used to calculate a strength of a color component depending on an associated drive parameter or an associated property of an assistance mode.

Preferably, the drive parameters of an assistance mode are variable, and the color code for this assistance mode is continuously recalculated, wherein the associated color is adapted to the color code when the assistance mode is displayed via the user interface. Alternatively or additionally, two color codes for different values of the drive parameter are calculated using the color calculation rule for the assistance mode with variable drive parameter, which define a first color and a second color, wherein a color change between the first color and the second color is displayed when the assistance mode is displayed via the user interface. This means that for those assistance modes where the properties required for the color calculation rule and thus the drive parameters are not unique, as these can change over time, either the color code is continuously recalculated and the displayed color is adjusted accordingly or two different color codes are calculated, which are preferably each based on extreme values of a drive parameter for an assistance mode. If two different color codes have been calculated, a continuous compartment change between the colors described by these color codes can be displayed on the user interface to indicate the respective assistance mode.

It is also advantageous if the color calculation rule calculates the color code from a maximum torque stored for the associated assistance mode and/or an assistance factor stored for the associated assistance mode. These drive parameters are particularly characteristic for a user to perceive and are therefore preferably represented by the color code.

Furthermore, it is advantageous if values of the drive parameters for a set of drive parameters are configurable by the user via the configuration interface, and a number of characteristic values are represented by the configuration interface, each characteristic value describing a behavior of the drive control of the bicycle for the values configured for the set of drive parameters. This means that when adjustable drive parameters for an assistance mode are changed, the user is immediately provided with feedback that displays the driving behavior resulting from the set drive parameters.

It is advantageous if the characteristic values are displayed in the form of a network diagram via the configuration interface. This makes it possible to display several characteristic values in a single diagram and to create a geometric shape. If a user is familiar with the use of the system, he will be able to deduce the behavior of a drive control caused by the configured drive parameters of an assistance mode from the geometric shape. This achieves a quickly perceptible intuitive display.

Preferably, the control system is configured to perform an automatic change between different assistance modes so that the drive control after the change is based on the set of drive parameters of the assistance mode to which the change was made. In other words, this means that the control system is configured to first perform drive control in accordance with a first assistance mode and then automatically, i.e., without user intervention, switch from the first assistance mode to a second assistance mode in order to perform drive control in accordance with the second assistance mode. In particular, the assistance mode is an assistance mode that can also be selected manually by a user. Optionally, the assistance mode is an assistance mode that can only be selected automatically by the control system.

In particular, the automatic switch is linked to conditions that define when the automatic switch is executed. The automatic change is particularly dependent on at least one decision parameter. In particular, a condition is defined for the decision parameter and the automatic change takes place when the condition is met. In particular, the condition defines a threshold value for a decision parameter. The decision parameter is in particular a recorded measured value or an operating parameter of the bicycle. Exemplary decision parameters are a state of charge (SOC) of a battery of the bicycle, a recorded gradient, a rider's pulse, an average riding performance, a speed, a cadence and/or a selected gear ratio.

Preferably, the automatic change is dependent on at least one condition, which can be configured using the user interface. In particular, the user can set a threshold value for an associated decision parameter. The user can also configure the system by preselecting possible conditions. The condition does not have to be directly visible to the user if it is stored in a configuration option.

Furthermore, it is advantageous if the control system is configured to detect a user's riding behavior or an environmental condition during operation of the electric bicycle and to adapt the set of drive parameters based on the detected riding behavior or to create a new set of drive parameters. In this way, the behavior of the drive control is automatically adapted to the user. It is advantageous if a confirmation by a user is carried out before the drive parameters are adjusted. This makes it easier for the user to access the settings and increases the attractiveness of configurable assistance modes. More complex assistance modes can be configured or created using intuitive recommendations. The new set of drive parameters is therefore preferably saved as a set of drive parameters for an assistance mode and is preferably not modified in the following after saving without further confirmation from the user.

The driving behavior of a user is recorded in particular via any sensor system, especially via an analysis of the measured values recorded by the sensor system over a period of time. In particular, the set of drive parameters is repeatedly adjusted until a certain operating state of the bicycle no longer occurs. For example, it analyzes whether a user exhibits a certain predefined behavior in a specific driving situation. If this is the case, the drive control is modified by adjusting the drive parameters so that this behavior of the user no longer occurs in the specific driving situation.

An environmental condition is a condition that describes the bicycle's surroundings. For example, the surface on which the bicycle is currently being ridden is detected by position tracking, an initial sensor system or a rider's torque. For example, a subsurface condition is recorded as ambient conditions.

Preferably, several presetting profiles are stored, with presettings for drive parameters of an assistance mode being defined by each of the presetting profiles, with the drive parameters associated with the new assistance mode being set in accordance with the presettings of one of the stored presetting profiles when a new assistance mode is created, and/or with the drive parameters associated with the assistance mode to be modified being set in accordance with the presettings of one of the stored presetting profiles when drive parameters of an assistance mode to be modified are modified. Each preset profile comprises one or more drive parameters or configurations for these drive parameters. The preset(s) for the drive parameters associated with a preset profile are used to set the corresponding drive parameters for an assistance mode. There are various ways to select which of the stored presetting profiles is used to set the drive parameters according to the presettings.

Modifying drive parameters for an assistance mode and creating a new assistance mode is preferably done via a smartphone app connection or similar, for example using a suitable computer program. This enables the user to make settings on the ride controller via the app. Since it is possible to modify the drive parameters of an assistance mode or create new assistance modes for a user, the assistance modes created or modified in this way are also referred to as "User Defined Assistance Modes" (UDAM). This makes it possible to individualize the assistance modes of the electric bicycle. The assistance modes can comprise several drive parameters, some of which overlap functionally. The drive parameters are mostly technical parameters (e.g., maximum torque), which require a basic technical understanding from the user. For example, the drive parameters can be set using sliders. Several sliders are conceivable for one assistance mode, e.g., more than 4, in order to configure different drive parameters, all of which influence the riding behavior of the electric bicycle. If each slider has only 10 discrete settings, the user already has 10^4=1000 setting options. Setting the many drive parameters can be overwhelming for the user, as it can be technically demanding and complex. This difficulty for the user is reduced by the preset profiles. The preset profiles are also referred to as "presets".

This introduces presetting profiles for the drive parameters. With these presetting profiles, the user has an easy way to roughly preset the drive parameters according to his application. An optional fine adjustment can then be made by manually adjusting the drive parameters.

Preferably, one of the plurality of preset profiles is selected based on selection of a user via the configuration interface, one of the plurality of preset profiles is selected based on a category of the electric bicycle, one of the plurality of preset profiles is selected based on an active user profile, and/or one of the multiple preset profiles is selected based on a result of a question and answer dialog, wherein multiple questions are provided to a user and the preset profile is selected based on entered answers of the user, wherein the selected preset profile is used for creating the new assistance mode and/or for modifying the drive parameters. The preset profile is therefore either selected once by a user or determined based on other information. Alternatively, the desired preset profile is queried each time an assistance mode is configured, i.e., whenever a new assistance mode is created or when the drive parameters are modified, for example to reset the drive parameters of an existing assistance mode.

Preferably, one or more preset profiles can be configured via a service interface. The preset profiles are preferably not changeable by an end user. This allows OEMs or dealers to preconfigure specific presetting profiles.

Preferably, the drive parameters set according to the selected presetting profile can subsequently be modified by a user. The user is thus given a starting point for a user configuration via the preset profile and the associated drive parameters.

It is also advantageous if the control unit comprises an interface to a configuration platform and is configured to receive and store several sets of drive parameters for a first number of assistance modes via the interface. In particular, the interface is an interface to a configuration platform that is provided via a server in a telecommunications network. This makes it possible to configure the assistance modes using the configuration platform and play them on the control system.

It is advantageous if the control unit is configured to receive a selection from a user, through which a selection of a second number of assistance modes from the first number of assistance modes is made, and to provide the second number of assistance modes for selection during operation of the bicycle. In particular, the first number is greater than the second number. In other words, this means that more assistance modes with the associated drive parameters are stored on the control unit than can be actively selected when the bicycle is being operated via the control interface. For example, some of the assistance modes must first be activated via the configuration interface so that they can be selected via the operating interface. This allows the control system to be reconfigured and the available assistance modes to be made available for use, even if no connection to a configuration platform can currently be established. At the same time, only a number of assistance modes can be selected at any one time via the user interface, which allows the user to handle the device sensibly.

Furthermore, a configuration system comprising the control system according to the disclosure and a configuration platform is advantageous. The configuration platform is configured to perform a selection of several assistance modes from a plurality of available assistance modes in order to define a pool of assistance modes, to enable a user to select several assistance modes from the pool of assistance modes, and to transfer the assistance modes selected from the pool of assistance modes with the drive parameters associated with these assistance modes to the operating unit of the control system via an interface. In particular, the configuration platform is an online platform and is provided via a server of a telecommunication network. The interface is an interface to the telecommunication network.

The selection of several assistance modes from a large number of available assistance modes comprises, in particular, filtering according to an identifier that describes the type of bicycle associated with the control system. Optionally, by filtering from the multitude of assistance modes, for example, only those assistance modes are selected as belonging to the pool of assistance modes that are permitted for a specific product line, a specific user, a specific region, a specific speed, a specific type of bicycle or a specific serial number. The user makes a selection from the pool of assistance modes in order to select the assistance modes intended for a specific operating unit. These are loaded onto the corresponding operating unit via the interface.

BRIEF DESCRIPTION OF THE DRAWINGS

Exemplary embodiments of the disclosure are described in detail in the following with reference to the accompanying drawing. In the drawings.

DETAILED DESCRIPTION

Figure 1:
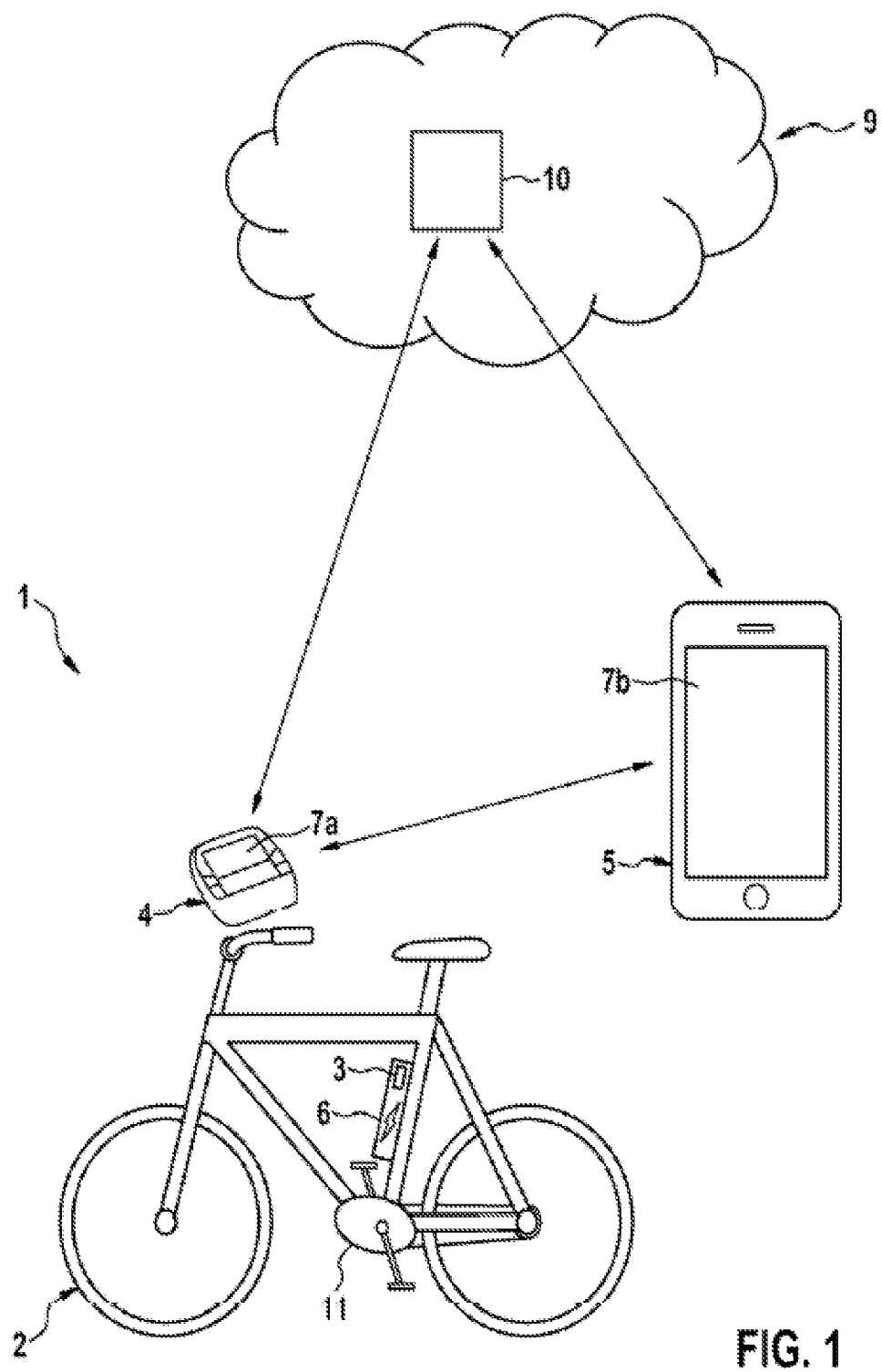
FIG. 1 is an exemplary representation of a control system according to the disclosure.

FIG. 1 shows a control system 1 according to an embodiment of the disclosure. The control system 1 comprises an operating unit 4, which is arranged on an electric bicycle 2 and enables the electric bicycle 2 to be operated. A battery unit 6 and an electric motor 11 are arranged on the electric bicycle 2. A ride controller 3 is also arranged on the battery unit 6, which is configured to provide drive control of the electric bicycle 2. The motor 11 is controlled by the ride controller 3. The drive control is based on a set of drive parameters, wherein the set of drive parameters is assigned to a selectable assistance mode, which can be selected by a user by means of the control unit 4.

The control unit 4 is preferably a dedicated unit which can be connected to the electric bicycle 2 and the ride controller 3, for example by means of a plug-in interface, and is therefore typically regarded as a component of the electric bicycle 2. Alternatively, the operating unit 4 is a mobile terminal device which communicates with the ride controller 3, for example by means of a wireless interface such as Bluetooth.

In preferred embodiments, a mobile unit, for example a smartphone 5, is configured to communicate with the control unit 4 of the electric bicycle 2. The operating unit 4 and the ride controller 3 are configured using an app loaded onto the smartphone 5.

The control unit 4 is configured to allow a user to select between a plurality of assistance modes 21-24 via a user interface 7a. For this purpose, the operating interface 7a comprises in particular a selection unit which comprises two selection buttons by means of which an assistance mode can be selected by a user during a ride on the bicycle 2 in order to trigger drive control in accordance with the drive parameters stored for this assistance mode. The operating interface 7a comprises a display unit that shows the user which assistance mode is currently selected. The display unit is, for example, a display or at least one LED, wherein the selected assistance mode is indicated by different colors of an LED or a different number of activated LEDs.

The control unit 4 is configured to control the ride controller 3 in such a way that the drive for the motor 11 of the bicycle 2 is controlled in accordance with the drive parameters of a selected assistance mode.

The control system 1 comprises a configuration interface 7b that allows a user to modify drive parameters and/or create new assistance modes. The drive parameters for an assistance mode can therefore be configured using the configuration interface 7b. The configuration interface 7b and the operating interface 7a can be a common unit. For example, the operating interface 7a comprises a display for showing the selected mode and the configuration interface 7b is provided via the same display in a configuration mode. Alternatively or additionally, the configuration interface 7b is provided via the smartphone 5, wherein the configured drive parameters are transmitted to the control unit 4 by radio, for example.

Drive parameters that are configured by the user via the configuration interface 7b of the smartphone 5 are preferably first transmitted to the control unit 4 and provided by it to the ride controller 3. The control unit 4 or the smartphone 5 can also be used to adapt or convert the drive parameters into parameters that can be processed by the ride controller 3.

The operating unit 4 is configured to calculate a key FIG. 31-36 for each assistance mode 21-26 stored on the operating unit 4 by means of a key figure calculation rule, based on the drive parameters stored for the respective assistance mode, and to perform a sorting of the assistance modes 21-26 in a display in the operating interface 7a based on the key FIG. 31-36 calculated for the assistance modes 21-26. This is shown schematically in FIG. 2. For example, a set 20 of assistance modes is stored in the control unit 4. The set 20 of assistance modes comprises, for example, a first assistance mode 21, a second assistance mode 22, a third assistance mode 23, a fourth assistance mode 24, a fifth assistance mode 25 and a sixth assistance mode 26.

The configuration interface 7b is used to select assistance modes from the set 20 of assistance modes, wherein these selected assistance modes 21-24 are displayed in the operating interface 7a. The aim is to sort the assistance modes 21-24 such that they are sorted according to a strength in the selection provided via the user interface 7a or in a selection sequence provided via the user interface 7a, wherein the strength is a strength of an assistance perceived by the user. For each assistance mode of the set 20 of assistance modes, a key FIG. 31-36 is calculated. This is done using the key figure calculation rule, wherein the same key figure calculation rule is used to calculate the key figure for each assistance mode in the set of 20 assistance modes.

Thus, each assistance mode 21-26 of the set 20 of assistance modes is assigned exactly one key figure. Thus, the first assistance mode 21 is assigned a first key FIG. 31, the second assistance mode 22 is assigned a second key FIG. 32, the third assistance mode 23 is assigned a third key FIG. 33, the fourth assistance mode 24 is assigned a fourth key FIG. 34, the fifth assistance mode 25 is assigned a fifth key FIG. 35 and the sixth assistance mode 26 is assigned a sixth key FIG. 36.

The key figure is calculated, for example, according to the key figure calculation rule from a maximum torque stored for the associated support mode and/or a support factor stored for the associated support mode. For example, a first maximum torque and a first assistance factor are stored as drive parameters for the first assistance mode 21. An exemplary key figure calculation rule defines that the maximum torque is to be multiplied by a factor and the stored assistance factor is to be multiplied by a factor. The results obtained in this way could in turn be weighted and added together to arrive at the key figure.

When calculating the key figure based on the stored maximum torque and/or the stored assistance factor, the problem arises that a characteristic curve and not a single factor is typically stored for these values. A common operating point is therefore preferably defined, which is used as the basis for calculating the key figure using the key figure calculation rule.

Figure 3:
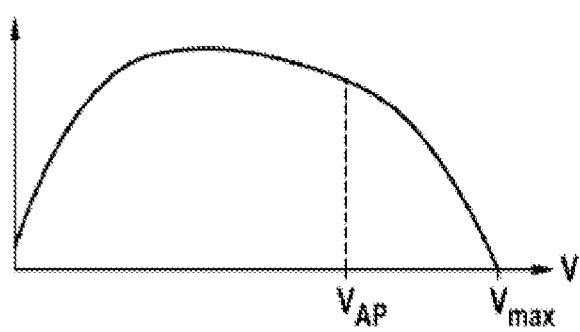
FIG. 3 is a representation of two characteristic curves for a maximum motor torque and an assistance factor.
Figure 3:
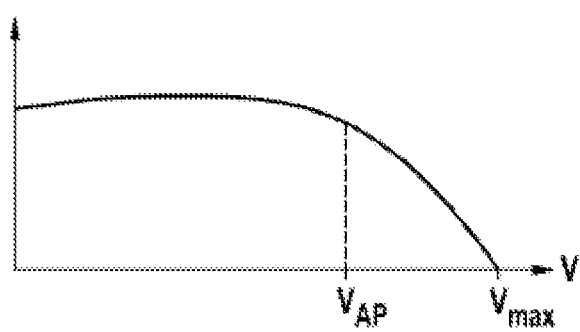

FIG. 3 shows an example of how a curve of a maximum torque over the speed and a curve of an assistance factor for the speed of the bicycle 2 is selected. FIG. 3 above shows a curve for the stored maximum torque and FIG. 3 below shows a curve for the stored assistance factor. It can be seen that both of these values have a value of >0 up to a speed of Vmax, e.g., 25 km/h. It is also shown that an operating point can be defined by a speed vAP, for example. The value of the maximum torque used for calculating the key figure is, for example, the value resulting from the characteristic curve for the speed vAP shown in FIG. 3. Accordingly, the assistance factor selected for calculating the key figure in accordance with the key figure calculation rule is the assistance factor that results for the speed vAP in the characteristic curve shown in FIG. 3 below.

The calculation rule for the key figure is preferably selected so that a higher maximum torque and a higher assistance factor also result in a higher key figure than with comparatively lower values for the maximum torque and the assistance factor. A weighting can be made between the maximum torque and the assistance factor.

Figure 2:
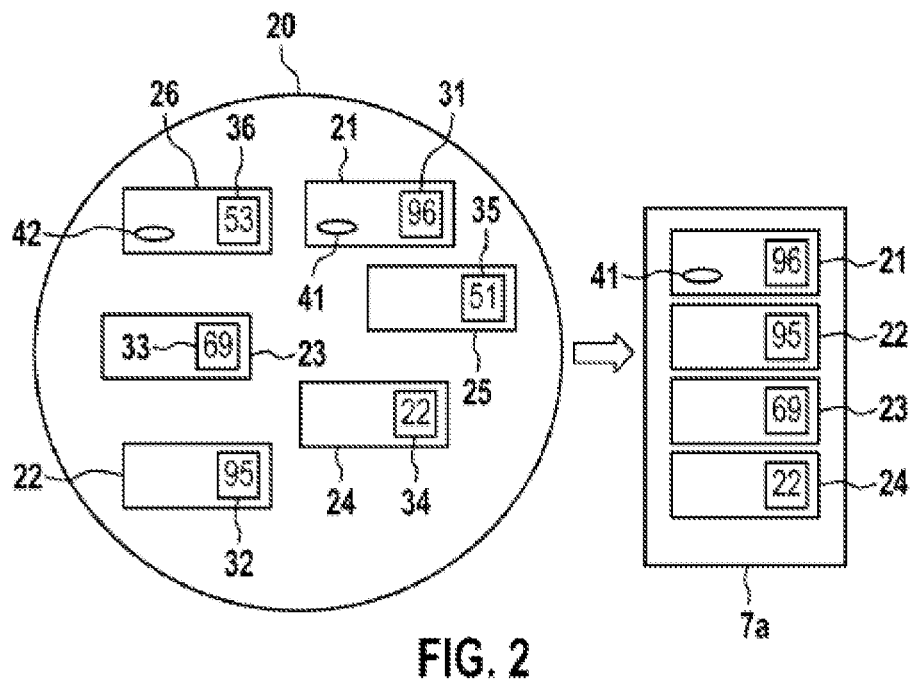
FIG. 2 is a schematic representation of the sorting of assistance modes.

FIG. 2 shows exemplary values for the calculated key figures, i.e., the first to sixth key FIGS. 31 through 36. To sort a selection of assistance modes from the set 20 of assistance modes in the user interface 7a, sorting is performed based on the key figure, in particular on the size of the key figure. For example, the assistance modes 21-24, which are displayed via the user interface 7a, are sorted in descending order according to the size of their key FIG. 31-34. Since the key figure is also an indicator of the strength of the assistance mode, as this is based on the maximum torque and the stored assistance factor, the assistance modes shown in the user interface 7a are sorted according to their strength.

With regard to the specified common operating point, it should be noted that this can be defined by several values, not just by the speed vAP. For example, an exemplary operating point is a combination of values for a speed, a rider's torque, a given acceleration, a given pedaling speed and others. This is advantageous because the characteristic curves for maximum torque and the assistance factor can be highly non-linear and in turn depend on riding speed, acceleration, rider's torque and rider's cadence, i.e., cadence. Therefore, for example, a model defined by the key figure calculation rule must be configured accordingly so that the key figure can be determined based on the model and therefore based on the key figure calculation rule. For example, an operating point is set at 20 km/h, 20 nm rider's torque, 0 m/s$^2$ acceleration and a rider's cadence of 60 RPM. The maximum values for these parameters can also simply be selected.

In the characteristic curves shown in FIG. 3, the operating point was selected as an example at a speed vAP of 20 km/h. Depending on the Y value, a parameter is defined for the key figure. Weighted, the individual parameters for the key figure result in a specific final key figure. The operating point can be selected differently depending on the bicycle category, i.e., depending on the type of electric bicycle 2. For example, a mountain bike may have a different operating point as the basis for calculating the key figure than a city bike. This means that the sorting can be different depending on the category. The operating point can also be learned individually for each rider. For example, each rider typically has an individual favorite cadence and a favorite torque, which can also be used to parameterize a model for calculating the key figure.

Sorting can take place in a drive unit or also in a display of the operating unit 4. If the sorting is already carried out in the drive unit, the assistance modes to be displayed via the operating interface 7a can be transferred to the operating interface 7a of the operating unit 4 via an ordered array.

Instead of a single operating point, several weighted operating points can also be used. In mountainous regions in particular, it can be useful to evaluate several working points at different gradients in addition to the main working point on the level. The geographical location can therefore also be used for sorting.

In the example described above, the key FIGS. 31-36 are calculated by the control unit 4. In alternative embodiments, however, it is advantageous if the operating unit 4 is configured to provide the drive parameters stored for the respective assistance modes 21-26 via an interface and to subsequently receive the key FIGS. 31-36 via the interface and to carry out the sorting of the assistance modes 21-24 in a display in the operating interface 7a based on the key FIGS. 31-24 received for the assistance modes 21-24. This means that the drive parameters required for executing the key figure calculation rule are first provided via the interface for an external system and the result of the key figure calculation rule, i.e., the key figure, is then received and used for sorting. In particular, the interface is an interface to a telecommunications network and the drive parameters stored for the respective assistance modes are transmitted to a server 10 and the key figure is received by the server 10. In this way, the key figures can be set and corrected by a manufacturer, for example. A manufacturer can therefore review the key figure determined for an assistance mode.

Regardless of the location or unit at which the key figure is calculated, the calculation of the key figure is based in particular on a model through which the strength of the mode is assessed. This model is described by the key figure calculation rule. In particular, the key figure is used to determine the strength of the assistance mode. The assistance factor is a quotient of motor and rider's torque.

In the assistance modes in the set 20 of assistance modes shown in FIG. 2, for example, only the first mode 21 and the sixth mode 26 are configurable by a user. The second mode 22 through the fifth mode 25 cannot be configured or modified by a user. This means that the values for the drive parameters of these assistance modes cannot be changed by the user.

For example, the first mode 21 is a mode that was named "Cube Turbo" by a user and the sixth mode 26 is a mode that was named "User Tour" by a user. The other modes are assistance modes predefined by the manufacturer. Thus, the second mode 22 is a mode designated as "Turbo", the third mode 23 is a mode designated as "Sport", the fourth mode 24 is a mode designated as "ECO" and the fifth mode 25 is a mode designated as "Tour".

The second through fifth assistance modes 22 through 25 are assistance modes preconfigured by the manufacturer. The first assistance mode 21, the second assistance mode 22, the third assistance mode 23 and the fourth assistance mode 24 are displayed for selection via the control interface 7a or can be selected via the control interface 7a. The selection of which assistance modes are displayed or selectable via the operating interface 7a was made via the configuration interface 7b.

It can be seen from this selection of assistance modes displayed via the user interface 7a that only the first assistance mode 21 is a configurable assistance mode, as the other assistance modes 22, 23, 24 are specified as non-configurable by the manufacturer. When using the various assistance modes 21-24 from the user interface 7a, a user may find that an adjustment to the drive parameters of one of these assistance modes 21-24 is desirable. However, this is not possible for all of these assistance modes 21-24. It is therefore advantageous if the control system 1 is configured to display an indicator in the user interface 7a, which indicates whether an assistance mode 21-24 can be modified by a user. For example, a first indicator 41 is shown in FIG. 2, which is graphically attached to a selection area for selecting the first assistance mode 21. For example, in the representation of the operating interface 7a shown in FIG. 2, it is immediately apparent that only the first assistance mode 21 shown at the top can be modified/configured by a user.

In the example described here, the indicator, i.e., the first indicator 41, is shown in a representation of the selectable assistance modes in the user interface 7a. Alternatively, however, it is also advantageous if this indicator is displayed in a configuration interface 7b, in which, for example, a selection can be made as to which assistance modes from the assistance modes of the set 20 of assistance modes are displayed via the operating interface 7a. This is also exemplified in FIG. 2, where it can be seen that the first assistance mode 21 and the sixth assistance mode 26 are marked by a first indicator 41 and by a second indicator 42 to indicate that these assistance modes are configurable by a user.

Optionally, individual assistance modes can be enabled for modification by the user via the interface to the server 10.

It is also advantageous if a distance covered by the user on the bicycle 2 is recorded by the operating unit 4 and a specific assistance mode is only enabled for selection via the operating interface 7a or for configuration by the user via the configuration interface 7b when a defined minimum distance has been covered. For example, a certain assistance mode only becomes available or configurable for the user once they have covered more than 1000 km on the bicycle 2. Similarly, a limitation can also be removed when configuring existing assistance modes if the defined minimum distance has been covered. For example, stronger assistance modes can be selected if it is ensured that the user has sufficient practice in handling the bicycle 2 by covering the minimum distance.

Optionally, depending on the strength of the selected settings for an assistance mode, the user can be informed that appropriate riding experience is recommended for the selected assistance mode and setting.

Preferably, a mode is provided by the control system 1 by limiting a possible selection from the assistance modes via the operating interface 7a for predefined route sections. This makes it possible for different users to ride the predefined sections of the route with appropriate assistance from the motor 11 of the bicycle 2. The mode is therefore also referred to below as competition mode.

With conventional bicycles, i.e., bicycles without electric assistance, such as racing bikes, different riders and therefore users can compare their riding times for individual routes and sections. With electric bikes, it is not possible to compare the times ridden by different users without the mode for limiting the possible selection of an assistance mode, as the motor and battery power can greatly distort the times ridden.

Competition mode can be used to set a specific assistance mode for a predefined section of the route if a comparison time is required. In this way, the motor power can be fixed and used to compare sections driven by different users.

To enable the comparison of journeys by different users, a route is first defined with one or more route sections. An individual route section is also referred to as a "segment". The route and the associated route sections are defined, for example, via a configuration platform provided by the server 10. A route can be defined by means of a map or individual route sections can be defined by characteristics of a route, such as length and gradient. Furthermore, an assistance mode is assigned to each route section using the configuration platform. An assistance mode assigned to a route section is not necessarily available on the control system 1 of the electric bicycle. an assistance mode defined for a route section is therefore preferably transmitted to the control system 1 together with the associated drive parameters together with the definition of the route section.

In particular, each predefined route section is assigned exactly one assistance mode and the control system 1 is limited to exactly the assistance mode predefined for the route section in the mode in which a limitation of a possible selection from the assistance modes is limited. This means that a predefined section of the route must be ridden with a specific assistance mode.

As an alternative to the configuration platform, a predefined route section with associated assistance modes can also be defined by riding the electric bicycle 2 on the corresponding route sections in the associated assistance mode and recording the predefined route sections together with the assistance mode used by the control system 1 and transmitting them to the server 10.

If the competition mode is selected, the configuration interface 7b or the operating interface 7a makes it possible to select a predefined route with predefined route sections with which a user wants to compare himself. The available possible routes are retrieved from server 10. To enable a comparison of different users in the sense of a competition, it is possible for a user to download such routes and route sections with the associated defined assistance modes from the server 10 that were previously uploaded to the server 10 by another user.

For example, a route comprising a first route section, a second route section and a third route section is downloaded from the server 10. The first section of the route is to be traveled in the first assistance mode 21, the second section of the route is to be traveled in the second assistance mode 22 and the third section of the route is to be traveled in the third assistance mode 23. If the user sets off on the route with the competition mode switched on, the first assistance mode 21 is automatically activated by the control system 1 in the first section of the route. The user does not have the option of changing this assistance mode unless competition mode is exited. In this case, no comparable time is recorded. When the user reaches the second section of the route on the bicycle 2, the system automatically switches from the first assistance mode 21 to the second assistance mode 22. When the user reaches the third section of the route, the control system 1 automatically switches from the second assistance mode 22 to the third assistance mode 23. It should be noted that it can also be defined that no assistance is provided by the electric motor 11 in a section of the route. Optionally, it is predefined for a route section which motor power is provided within this route section.

An assistance mode, which is assigned to a route section, can also be defined variably. For example, a degree of assistance can change continuously and, after entering a section of the route, can be continuously reduced, increased or varied according to a predefined curve.

The control system 1 is thus also configured to receive predefined route sections, with the control system 1 optionally receiving associated assistance modes with associated drive parameters for each or individual route sections. If the competition mode is selected and such a route is selected, only the assistance modes assigned to the segments are permitted for the operation of the bicycle 2.

The above description refers to routes and route sections. However, the logic described here can also be applied to complete routes, tours or tracks. The comparability of segments or route sections requires that the same driving mode is selected that a creator has selected when driving on the route section. For this purpose, if technically permissible for the control system 1, the corresponding assistance mode is transferred to the control system 1 of the bicycle 2 for the ride along the route section if the assistance mode is not yet available on the control system 1.

The control system 1 fixes the assistance mode after the start of the competition mode and after the start of a route section so that the entire route section can be evaluated comparably. It is also possible that the selected route section stipulates that you must ride in "Off" mode, i.e., without assistance.

It is also possible that it is a matter of driving through the segment in different assistance modes. For this purpose, the combination or sequence of assistance modes of the creator of the route section is saved and all those who ride the route section are automatically switched to the assistance modes that the creator of the route section used on his ride. It is also possible to create such segments "on paper or digitally" without having to drive them first. This is done, for example, via the configuration platform provided on the server 10. This results in further possibilities, e.g., that the degree of assistance changes continuously and slowly decreases after entering a section of the route. Here, too, all those who follow the route section automatically have the setting transferred to the control system 1 of their bicycle 2.

The assistance mode used can no longer be changed manually in the competition mode after entering the first section of the course if the user wishes to evaluate the time. However, the user can change the assistance mode manually at any time, although this will result in exiting competition mode. A warning is preferably displayed and explicit confirmation by the user is required, as in this case the segment cannot be evaluated if the assistance mode is changed.

Preferably, when evaluating best times for the corresponding sections of the course, you can switch between different specifications for an assistance mode and view the respective best times and challenge them by using the competition mode.

In addition to the assistance mode, individual drive parameters can also be fixed in the competition mode, e.g., a maximum torque or a maximum speed assistance, and/or other drive parameters can be set. The setting of the values of individual drive parameters for an assistance mode is therefore another variable that can be used to classify best times. So that this does not lead to any number of combinations, a limitation of possible values for drive parameters of an assistance mode can be selected for the evaluation of the time.

The configuration platform is provided in particular by means of an app on the smartphone 5, which is connected to the server 10 via a telecommunications network 9, typically the Internet. The configuration interface 7b of the smartphone 5 can also be used to create or download a comparison route that can be used in competition mode.

The assistance modes that can be selected for use via the operating interface 7b are each marked with an associated color. Either an indicator for a specific assistance mode is colored in the color associated with the assistance mode or only one color is displayed to indicate that a specific assistance mode is selected. In order to display a characteristic of the assistance mode to the user, each assistance mode is not merely assigned a predetermined color, but a color is calculated for each assistance mode, in particular a color code is calculated based on a color calculation rule.

For example, the color code is an RGB code. The color code defines the color that is displayed for an assistance mode. The color code is calculated using the color calculation rule from the drive parameters stored for an assistance mode. The color code describes the brightness and/or hue of the color. The color displayed via the operating interface 7a is therefore not predefined by the manufacturer for an assistance mode or a memory location, but the color is derived from the properties of the respective assistance mode. This is done using the color calculation rule. This ensures that certain driving characteristics are clearly displayed for the user using a color scale. The relationship between the characteristics of an assistance mode and the displayed color is defined by the color calculation rule. Similar driving behavior, i.e., similar characteristics, always lead to a similar color. This makes the various assistance modes comparable for the user. The color can be automatically adjusted according to the color calculation rule when an assistance mode is modified via the configuration interface 7b. A newly created assistance mode can also be assigned a color code and thus a color.

In addition to the color coding of driving characteristics, further differentiation can also be achieved by adjusting the brightness of the color or by color gradients and/or brightness gradients. For example, it is advantageous if the color calculation rule comprises a parameter that leads to a flashing of the color, i.e., a successive change in brightness, if the characteristic of an assistance mode describes a particularly aggressive mode.

If the drive parameters of an assistance mode are variable, the color code is continuously recalculated for this assistance mode, wherein the color displayed for an assistance mode is continuously adapted to the color code when the assistance mode is displayed via the operating interface 7a. An assistance mode is variable if it can be adjusted via the configuration interface 7b or is changed via another mechanism, for example varying over time in the competition mode. For example, in an automatic mode, which is a possible assistance mode, assistance from the motor 11 is adjusted for the user between low and high depending on the situation. For example, low assistance is represented by the color blue and strong assistance by the color red. Both the color blue and the color red were calculated based on the color calculation rule and reflect a low or strong assistance as a characteristic of the automatic mode. The characteristics of an assistance mode are defined by the stored drive parameters or are calculated from them. To show the different characteristics occurring in automatic mode, which are represented by the colors blue and red, a smooth periodic continuous color change between blue and red is displayed. To signal the characteristics of this assistance mode to the user.

The color calculation rule is used to calculate two color codes that define a first color, in this case blue, and a second color, in this case red. When the assistance mode is displayed via the operating interface 7a, a color change between the first color and the second color is displayed.

If the color code for an assistance mode is continuously recalculated, wherein the associated color is adapted to the color code when the assistance mode is displayed via the user interface 7a, a color is displayed for the user at each point in time that corresponds to the current behavior, i.e., the current characteristic of the respective assistance mode.

The additional dimension of the temporal change in brightness and temporal change in color can significantly expand the display space compared to a one-dimensional color, so that more complex calculation functions are possible and the user can be provided with more information about the current assistance mode.

Using the color calculation rule, the color code is calculated, for example, from a maximum torque stored for an assistance mode and/or an assistance factor stored for the assistance mode. As with the key figure calculation rule, the maximum torque and/or the stored assistance factor can be used for a defined operating point.

A possible color calculation rule defines that an assistance mode is to be examined for an average assistance factor $f_{Mode}$, which results from the ratio of motor power to internal power, and this ratio is mapped onto a color scale, e.g., from a first color (e.g., blue) to a second color (e.g., red). For example, an assistance factor of 0 can correspond to the color blue, a maximum assistance factor of f=4 corresponds to the color red and in between, interpolation is performed for the average assistance factor according to the color wavelength. This is done, for example, based on the following formula:

$$\lambda_{Mode} = \lambda_{red} * \frac{f_{Mode}}{f_{Max}} + \lambda_{Blue} * \left(1 - \frac{f_{Mode}}{f_{Max}}\right) \quad (1)$$

The $\lambda_{Mode}$ value corresponds to the color wavelength, which is described by the color code for the average assistance factor. The values $_{red}$ and $_{blue}$ correspond to the color wavelengths of the colors red and blue. The color for the assistance mode results from the color wavelength and the color code is selected so that it defines the color associated with the assistance mode with the color wavelength $\lambda_{mode}$.

Another possible color calculation rule defines that assistance factors are dependent on the operating status. A variable assistance mode, for example, is specified with an assistance factor of between 1.2 and 3.4. The minimum of 1.2 can now be mapped to a color according to formula (1) as in the example above, and the maximum 3.4 can also be mapped to another color according to formula (1). The color to be displayed can now switch back and forth permanently between the two colors defined in this way, making this particular dynamic visible to the user.

Thus, from formula (1), a first color for a variable assistance mode can be calculated as $\lambda_{Mode,Min}$ for $f_{Mode,Min}=1.2$ and a second color for the variable assistance mode can be calculated as $\lambda_{Mode,Max}$ for $f_{Mode,Max}=3.4$. These colors are reproduced in a color change, which is also calculated by the color calculation rule. For example, the color calculation rule comprises a definition of a color $\lambda_{Mode,t}$ of a variable assistance mode over the course of time t:

$$\lambda_{Mode,t} = \lambda_{Mode,Min} * \sin(\omega t)^2 + \lambda_{Mode,Max} * \cos(\omega t)^2 \quad (2)$$

The period duration of the color change is defined by $\omega$. The colors red and blue are chosen as examples. Alternatively, any other combination of colors can be used.

Optionally, in addition to or as an alternative to the assistance factor, other or further properties of the assistance mode for which a color code is calculated are taken into account. Here, for example, metrics for the dynamics, a post-push behavior, a maximum assistance speed or also the maximum torque can be used.

Optionally, the color calculation rule is selected so that properties of an assistance mode that have no influence on a characteristic of the assistance mode, i.e., are not based on the drive parameters of an assistance mode, are also indicated by the color code and thus the color.

For example, the color code can be used to indicate whether it is an assistance mode configured by a manufacturer, an OEM or a user by adding a specific hue to the color code for one of the properties. For example, the assistance modes of a manufacturer are always represented by different shades of red or a red with different brightness levels, the assistance modes of an OEM are always represented by different shades of blue or a blue with different brightness levels, and the assistance modes of a user are always represented by different shades of gray or a gray with different brightness levels. This also makes it possible for each OEM to define and protect "its" color.

Alternatively, each bicycle category can have its own color (mountain bike modes: red tones, touring bike: green tones). The color calculation rule for the color selection is then adjusted accordingly, for example by adding a color component to a color calculated according to formulas (1) and/or (2).

If an assistance mode can be configured by the user via the configuration interface 7b, that is, values of the drive parameters for a set of drive parameters can be configured by the user via the configuration interface 7b, it is advantageous if a number of characteristic values are represented by the configuration interface 7b, each characteristic value describing a behavior of the drive control of the bicycle for the values configured for the set of drive parameters.

Figure 4:
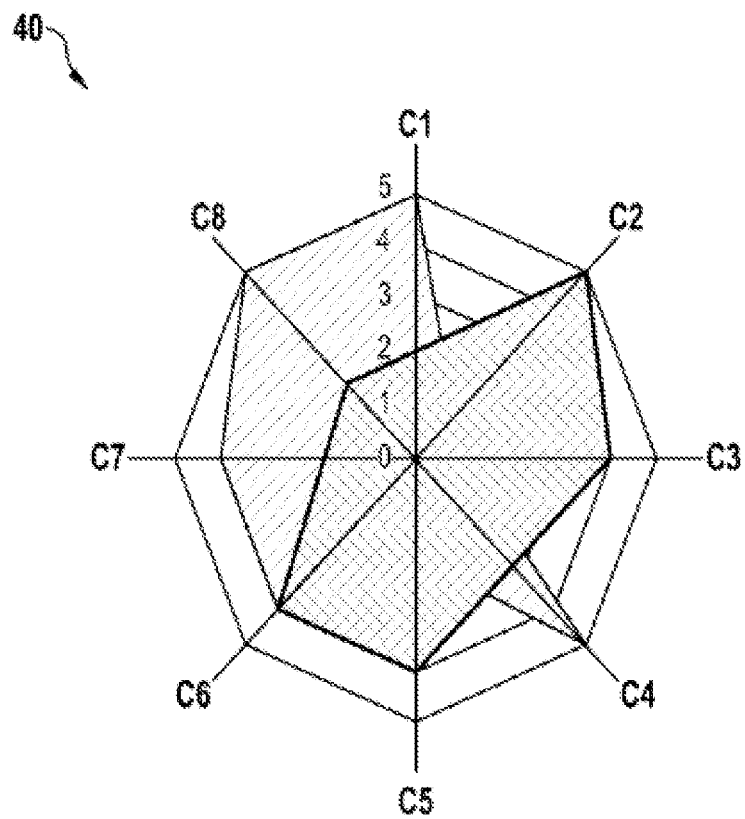
FIG. 4 is an example of a visualization of several characteristic values.

The characteristic values thus describe different properties of the drive control, such as agility, strength, range, calorie consumption, fun factor, comfort achieved, typical speed and power provided. FIG. 4 shows a view represented by the configuration interface 7b, in which values of drive parameters V1-V4 can be configured by a user via sliders, which is shown below in FIG. 4. For example, an agility can be set as a drive parameter as a first value V1. A second value V2 can be set as the value for an assistance factor as a drive parameter. As a third value V3, a value for a maximum torque can be set as a drive parameter. As a fourth value V4, a maximum speed can be set as a drive parameter. If an assistance mode is configured according to these drive parameters, it has a certain behavior that can be described by the characteristic values. The characteristic values are calculated from the configured drive parameters and displayed in the form of a network diagram 40 via the configuration interface 7b to enable a user to assess the overall characteristics of a configured assistance mode.

For example, the network diagram 40 is shown in FIG. 4 above, with strength as a characteristic value via a first axis C1, range as a characteristic value via a second axis C2, the user's expected calorie consumption as a characteristic value via a third axis C3, a fun factor as a characteristic value via a fourth axis C4, a comfort factor as a characteristic value via a fifth axis C5, speed as a characteristic value via a sixth axis C6, performance as a characteristic value via a seventh axis C7 and agility as a characteristic value via an eighth axis C8.

The characteristic values shown for the individual axes C1 through C8 are calculated from the values of the drive parameters V1-V4. It is also possible for individual drive parameters to be displayed directly as characteristic values. However, individual characteristic values are preferably calculated from a combination of several drive parameters.

FIG. 4 shows the characteristic values for two different assistance modes. For example, it can be seen that a first assistance mode, referred to as "Mode 1", provides great agility and strength in drive control. It can also be seen that in a second assistance mode, referred to as "Mode 2", a greater range is achieved with higher calorie consumption than with drive control. Once a user is accustomed to the typical display of characteristic values in the network diagram 40, the property or characteristic of an assistance mode can be recognized by a user at a glance. Since system behavior in drive control is not linearly dependent on the adjustable drive parameters, such a visual representation is advantageous as feedback, as it shows the effects of a configuration.

An algorithm directly calculates the effects of a changed value of a drive parameter on the riding behavior of the bicycle 2 and thus also calculates the characteristic values. The effects of the changed values on the overall behavior of the system are visualized in the diagram, which is selected here as a network diagram 40 as an example. If, for example, the maximum torque is reduced to 60 nm in the first assistance mode, such as an eco mode, which has a low assistance factor, this has no effect on the system behavior, as this assistance mode will never reach 60 nm on the system side. This can be represented by such a diagram. This allows the user to use the diagram to see the threshold at which a drive parameter value actually has a significant influence on the drive control. For example, if the assistance is increased, the strength, performance and fun factor will increase. At the same time, however, the range and calorie consumption are reduced.

It is assumed that the values of the drive parameters V1-V4 can be set by the user, but that predefined values of the configured assistance mode, referred to below as base values, also influence the characteristic values of an assistance mode. An example calculation rule for calculating a characteristic value, in this case the strength, is as follows:

$$\text{Strike} = (a * f(\text{Agility}_{UDAM}, \text{Agility}_{AssistMode}) +$$
$$b * f(\text{Assistance}_{UDAM}, \text{Assistance}_{AssistMode})) *$$
$$(f\text{MaxTorqueUDAM}, \text{MaxTorque}_{ProductLine})$$

$$\text{Strike} = \left(0.2 * \text{Min}(\text{Agility}_{UDAM} * \text{Agility}_{AssistMode}, 5) +\right.$$
$$0.8 * \text{Min}(AssistanceUDAM * AssistanceAs_{sistMode}, 5) * \frac{\text{MaxTorqueUDAM}}{\text{MaxTorque}_{ProductLine}}$$

The selectable parameter a is used to weight a first function, which is dependent on the agility of the assistance mode, and the selectable parameter b is used to weight a second function, which is dependent on the degree of assistance of the assistance mode. The buzzer from the first and second function is multiplied by a third function to determine the characteristic value for the strength. The third function is a function that depends on the maximum torque.

The first function depends on the agility set by the user and the agility stored as the base value for this assistance mode. This can be done, for example, by multiplying these values, wherein the first function is dependent on the resulting product. In the given formula, the value "AgilityUDAM" is an agility that is configured as a drive parameter by a user, i.e., the first value V1. The "AgilityAssistMode" parameter is a fixed base value for this assistance mode. The first function is in particular a selection of a minimum from the product of the agility configured by the user and the base value as well as a maximum value defining the value range of the agility, which is previously selected as "5" as an example.

The second function depends on the assistance degree set by the user and the assistance degree stored as the base value for this assistance mode. This can be done, for example, by multiplying these values, wherein the second function is dependent on the resulting product. In the given formula, the value "MaxTorqueUDAM" is a degree of assistance which is configured as a drive parameter by a user, i.e., the second value V2. The "MaxTorqueAssist Mode" value is a fixed base value for the assistance mode. The third function is in particular a selection of a minimum from the product of the assistance degree configured by the user and the base value as well as a maximum value defining the value range of the assistance degree, which is previously selected as "5" as an example.

The third function is dependent on the maximum torque set by the user and the maximum torque stored as the base value for the assistance mode. The third function is a division of these values, i.e., a division of the maximum torque set by the user, i.e., the third value V3, by the base value. The base value for the maximum torque is a technically permissible maximum value for the bicycle 2.

In order to bring different assistance modes to the control system 1, a configuration platform is advantageous, which is operated on the server 10, for example. The configuration platform enables a manufacturer, an OEM or a bicycle dealer, but also an end customer, to add new assistance modes to the control system 1 or to update existing assistance modes. Who can access control system 1 and who has access to the configuration platform is a configuration option. The configuration platform is provided with a large number of available assistance modes, for example by a manufacturer, by loading this large number of available assistance modes including the associated drive parameters onto the server 10. For example, all assistance modes configured by a manufacturer for all bicycle types and models are provided on the configuration platform.

The configuration platform is configured to execute a selection of several assistance modes from this multitude of available assistance modes in order to define a pool of assistance modes. For this purpose, filtering is carried out based on a filter parameter. For example, the multitude of available assistance modes is filtered to provide assistance modes for a specific product line, a specific region, a specific bicycle type or even for a desired speed. The filter criteria are preferably adjustable by a user and/or defined by the manufacturer for a user.

The assistance modes that match the filter criteria are added to the pool of assistance modes and displayed to the user. In the next step, the user can select several assistance modes from the pool of assistance modes. The assistance modes selected by the user are transmitted to the control unit 4 of the control system 1 via an interface. The interface is a telecommunications interface of the configuration platform, which allows a connection to the control system 1 either directly or via a mobile device, such as the smartphone 5.

When selecting several assistance modes from the pool of assistance modes, the user is optionally given the option of also selecting which of the assistance modes selected from the pool of assistance modes can be selected via the user interface 7a. As an option, it is possible for a user to modify an assistance mode from the pool of assistance modes, i.e., to change the drive parameters stored for this assistance mode. If more assistance modes from the pool of assistance modes have been loaded onto the control system 1 than can be selected via the operating interface 7a, it is possible to change this selection using the configuration interface 7b and make other assistance modes selectable via the operating interface 7a.

Optionally, the interface comprises a wired interface, which is established in particular between a local computer and the control system 1, wherein the local computer obtains the necessary information from the server 10 via the telecommunications network 9. This makes it possible for control system 1 to receive some or all of the assistance modes from the pool of assistance modes with the drive parameters configured for them.

The control unit 4 comprises an interface to the configuration platform and is configured to receive and store a first number of assistance modes with associated drive parameters for via the interface. To enable direct communication with the server 10, the interface is in particular an interface to a telecommunications network, especially an Internet interface.

The control unit 4 is configured to receive a selection from a user, in particular via the configuration interface 7b, by which a selection of a second number of assistance modes from the first number of assistance modes is made, wherein the second number of assistance modes is provided for selection during an operation of the bicycle 2 via the user interface 7a. In other words, this means that the control system 1 receives from the configuration platform a plurality of assistance modes corresponding to the assistance modes from the pool of assistance modes or a selection thereof. However, not all of these assistance modes can be selected immediately via the operating interface 7a, as this may only be able to provide fewer assistance modes. It is therefore advantageous if the user can select which of the assistance modes can be selected via the user interface 7a during operation of the bicycle 2. This is preferably done via the configuration interface 7b.

Preferably, the pool of assistance modes is stored on the server 10 and provided with an identifier that is individually assigned to the control system 1. The control system 1 is preferably configured to automatically establish a connection to the server 10 and to check whether the assistance modes from the pool of assistance modes or the selected assistance modes from the pool of assistance modes have been changed and to update the assistance modes stored locally in the control system 1 accordingly or to download new assistance modes. Individual assistance modes can also be removed from the control system 1 in this way, which could be necessary, for example, if problems occur with certain settings of an assistance mode.

It is optionally possible on the configuration platform for individual assistance modes in the pool of assistance modes to be marked as commercially available. Such assistance modes are not transmitted to the control system 1 or are transmitted to the control system 1, but cannot be selected via the user interface 7a. To make this possible, the assistance mode must first be purchased explicitly for a specific control system 1 or from an intermediary for further distribution and is then activated on the server 10 side or on the control system 1 side. Only when the assistance mode is enabled via the configuration platform or via the configuration interface 7b, for example by entering a license key, does it become permanently selectable via the operating interface 7a.

It is particularly advantageous if a test function is also stored, which enables an assistance mode to be transferred to the control unit 4 via the interface and can be used there for a limited period of time.

This allows manufacturers or OEMs to provide a greater number of assistance modes to enable dealers and cyclists to customize the bicycle 2. The selection of assistance modes for the right type of bicycle is time-consuming and is shortened by the configuration platform so that the manufacturer (OEM) has a suitable selection of assistance modes for the corresponding bicycle category available in a short time.

The manufacturer is able to make a preselection of assistance modes that the customer can switch while riding in order to differentiate themselves in the selection of assistance modes. It is also possible to define assistance modes for bicycle categories that are available on all bikes in the category, so that a dealer or end customer can compare or analyze the bicycle, regardless of the choice of manufacturer (OEM). The manufacturer (OEM) is given the opportunity to offer brand-specific assistance modes and make them available for its brand and bicycle category.

The manufacturer (OEM) and therefore also the end user should always have the current assistance modes available for selection for the configuration. This enables a large number of assistance modes to be managed and provided. The manufacturer (OEM) can decide whether further assistance modes can be added. The manufacturer (OEM) can decide whether assistance modes can be modified on a bicycle by the end customer (ODAM). The bicycle dealer can customize the assistance modes and thus offer the customer a bicycle 2 that is perfectly tailored to their needs.

The end customer can swap assistance modes without an Internet connection in order to be able to switch the assistance modes that are perfectly suited to the situation, for example by providing different assistance modes for the trip to the shops than for the eMTB trail in the user interface 7a via the configuration interface 7b. It is also possible to update assistance modes if a software update makes this necessary.

This enables further individualization through the management of a larger selection of assistance modes. assistance modes can be provided, exchanged and modified by specifically defined groups of users for a particular control system 1.

An implementation of in-app purchases is also advantageous here, which enables a user to purchase new assistance modes via a smartphone 5, for example by means of the configuration interface 7b, and to select them for selection via the user interface.

Preferably, more assistance modes can be stored on the control system 1 of the bicycle 2 than can be selected for use by a user.

The control system 1 preferably carries out a method for automatically switching between the selectable assistance modes. Thus, the control system 1 is configured to perform an automatic change between different selectable assistance modes so that the drive control after the change is based on the set of drive parameters of the assistance mode to which the change was made.

For example, the electric bicycle 2 is used by a user with the first assistance mode selected and the drive control is performed on the set of drive parameters of the first assistance mode. The control system 1 continuously checks whether a condition occurs that should trigger a change to an alternative assistance mode. If the condition occurs, the assistance mode is changed and the drive control is based on the set of drive parameters associated with the alternative assistance mode that was changed to. For example, the system automatically switches from the first assistance mode to a second assistance mode when the condition occurs. Accordingly, the drive control after the change is based on the set of drive parameters of the second assistance mode.

The condition can optionally be configured using the configuration interface 7b. For example, it is possible for a user to make a selection before riding the electric bicycle 2 using the smartphone 5, which selects the condition in which a change between different drive assistance modes takes place during the ride. Exemplary conditions, which can preferably also be configured by a user, are described by way of example in FIGS. 5 and 6.

Figure 5:
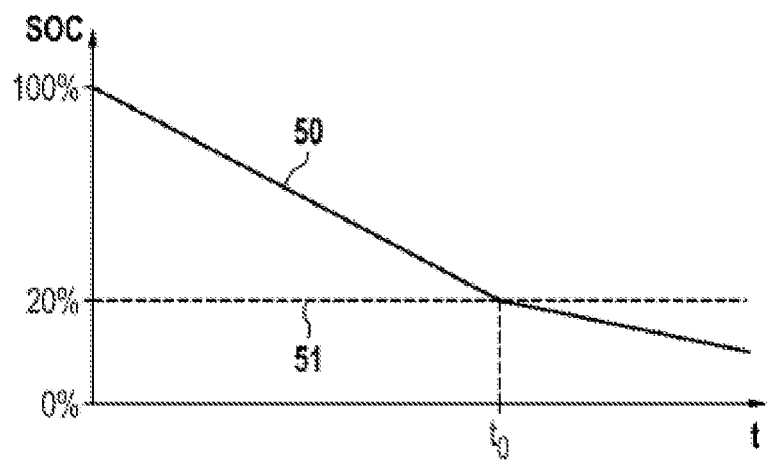
FIG. 5 is an example of the progression of a state of charge during operation of an electric bicycle.

In the example shown in FIG. 5, the condition is a threshold value 51 of a charge state. The state of charge is also referred to as the "State of Charge", or SOC. The threshold value 51 was selected by one user at 20%. The value of 20% should be regarded as an example, as the user can also configure other values, preferably within a predefined interval. FIG. 5 shows a charge state progression 50 over time during operation of the electric bicycle 2. At the start of the journey, the charge status is 100%. However, this decreases over the operating time of the electric bicycle 2 until it is equal to the threshold value 51 configured by the user at a point in time t0. The control system 1 recognizes that the condition has occurred at which an automatic change between different assistance modes is to be executed. At time t0, the system therefore switches from a first assistance mode to the fourth assistance mode 24. For example, the system switches to a more energy-efficient assistance mode. For example, you can switch from turbo mode to eco mode. After the time t0, the electric bicycle 2 is operated in the second assistance mode by the ride controller 3 and a drive control corresponding to the second assistance mode is executed by the ride controller 3. If the charge level rises again at a later point in time and is above the threshold value 51 again, the assistance mode is optionally reset to the assistance mode that was active before the change at time to.

Figure 6:
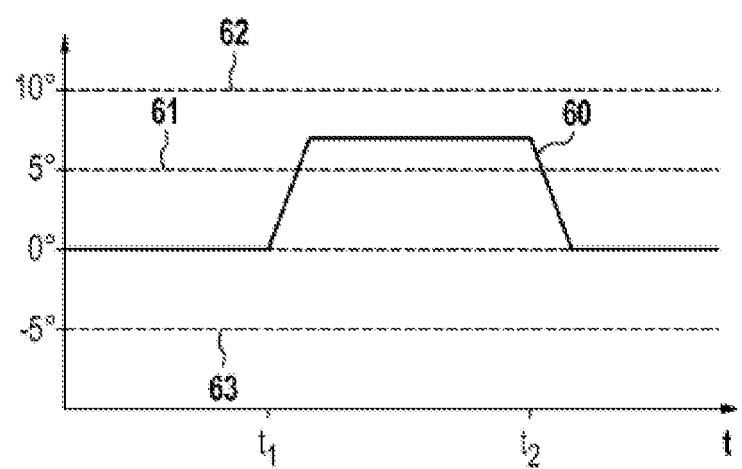
FIG. 6 is an example of the gradient of a road surface when the electric bicycle is in operation.

In the example shown in FIG. 6, the condition is a first threshold value 61 of an existing gradient. The incline is preferably an incline of a road surface on which the electric bicycle 2 is located, wherein the incline is detected, for example, via an inclination sensor of the control system 1. The threshold value 61 has been selected by a user at 5 degrees. The value of 5 degrees should be regarded as an example, as the user can also configure other values, preferably within a predefined interval. FIG. 6 shows a gradient curve 30 during operation of the electric bicycle 2 over a period of time. Thus, the electric bicycle 2 is initially operated at an incline of 0 degrees, wherein the drive of the electric bicycle 2 is controlled in accordance with a first assistance mode. At a first point in time t1, the inclination sensor of the control system 1 detects an increase in inclination. The gradient rises to over 5 degrees and thus exceeds the configured threshold value 61. This automatically switches from a first assistance mode to a second assistance mode, for example by providing the user with greater assistance from the motor 11. In the example shown in FIG. 6, the gradient drops again at a second point in time t2, causing an automatic change from the second assistance mode back to the first assistance mode.

Preferably, several conditions, for example several threshold values 61, 62, can be configured by the user. For example, the first threshold value 61 is set at 5 degrees and a second threshold value 62 at 10 degrees. For example, if the angle of incline increases further to a value above 10 degrees, an automatic change to a third assistance mode could take place, in which the user receives more assistance from the motor 11 than in the second assistance mode. A third threshold value 63 is optionally set at −5 degrees. For example, if the incline angle drops to a value below −5 degrees, there will be an automatic change to a fourth assistance mode, in which the user receives less assistance from the motor 11 than in the first assistance mode. For example, you can switch to ECO or touring mode.

Some or all of the threshold values 60, 61, 62 can optionally be configured by the user via the configuration interface 7b.

The automatic change between different assistance modes is also referred to as "Automatic Mode Change". The automatic changeover can be activated and deactivated by the user, for example via one of the operating interfaces 7a or the configuration interface 7b. When automatic switching is activated, control system 1 automatically switches between the existing assistance modes. The user can see the currently active assistance mode on a display of the operating unit 4, which represents the operating interface 7a. This means that he always has feedback on the known assistance mode of control system 1. The conditions on the basis of which the automatic changeover takes place are stored in a configuration. This configuration can, for example, be configured via an app running on the smartphone 5 and transmitted to the ride controller 3 of the electric bicycle 2.

Conditions can be defined and linked with each other for various variables of control system 1. For example, the system switches to an energy-saving assistance mode when the charge level drops below 20%. This condition is optionally marked with a high priority and is used as the preferred decision criterion. Additional conditions may also be configured. For example, if the incline is less than 5 degrees, an assistance mode is selected that provides assistance for covering particularly long distances. For example, a tour mode is selected. If the incline rises above 5 degrees, the system switches to a more supportive assistance mode, such as Sport mode. If the incline continues to rise, for example above 10 degrees, the system switches to an even more powerful assistance mode, such as turbo mode.

If conditions are selected for different input variables, priorities can optionally be defined. For example, despite a steep incline of over 10 degrees, the energy-saving assistance mode is still selected if the selection of a threshold value for the charge status is prioritized as a condition. By prioritizing the conditions, the conditions described in FIGS. 5 and 6 can be combined in this way, for example.

The automatic change between different operating modes based on the state of charge and based on an existing gradient, as described above in FIGS. 5 and 6, is advantageous, but should only be regarded as an exemplary choice of condition. Alternative or additional conditions may arise based on the following parameters: Rider pulse, average rider power, speed, cadence and/or selected gear ratio. For example, a user engages a lighter gear when there is a steep incline. As a result, the system automatically switches to a stronger assistance mode.

Users can fall back on predefined configurations or create their own configurations and adapt the conditions to suit their requirements.

Alternatively or additionally, the control system 1 is configured to detect or analyze a user's riding behavior during operation of the electric bicycle 2 and to adjust the set of drive parameters based on the detected riding behavior or to create or suggest a new set of drive parameters.

Figure 7:
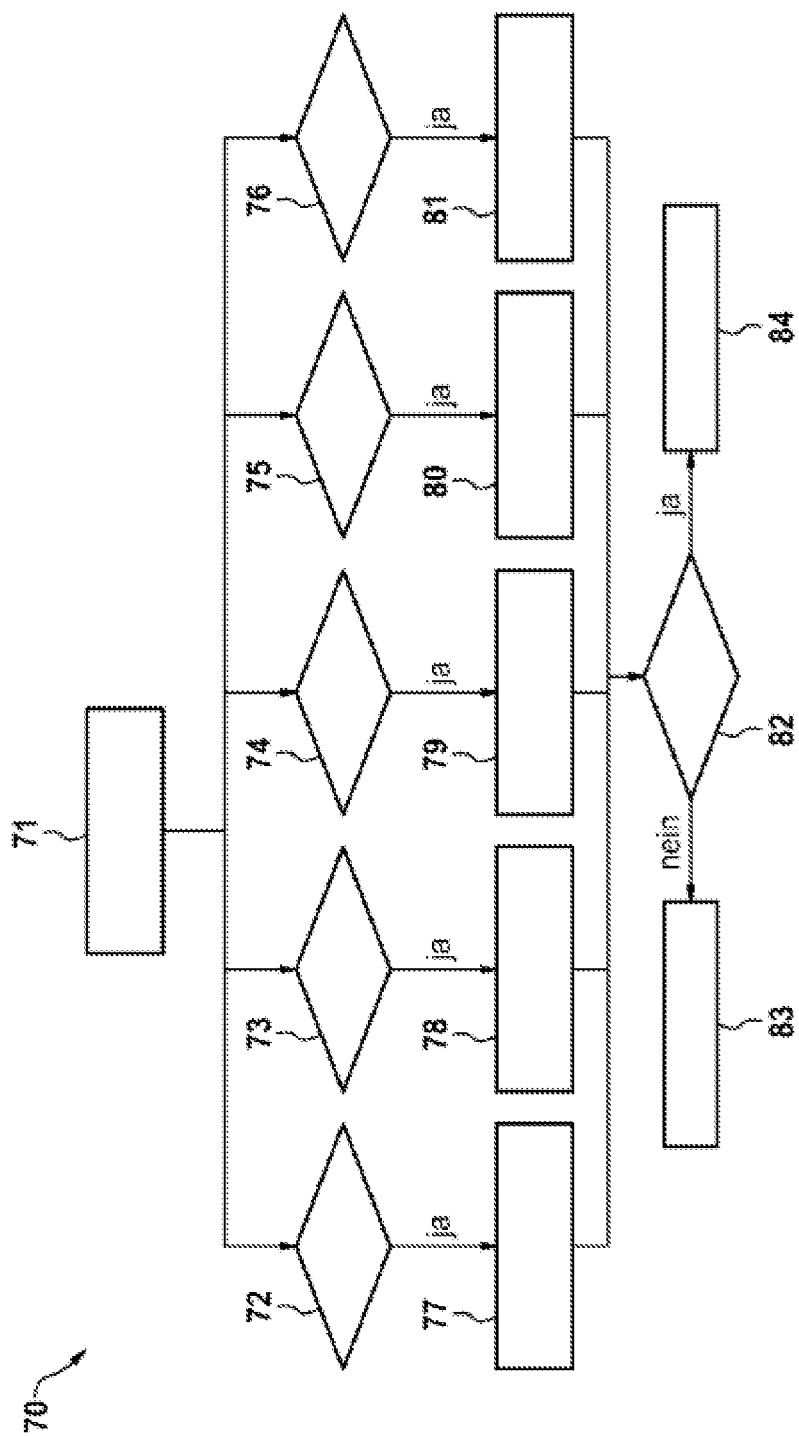
FIG. 7 is a flowchart for a method of creating or adjusting drive parameters for an assistance mode.

The drive parameters for an assistance mode are created or adapted using the method shown in FIG. 7, for example.

In the method 70 shown in FIG. 7, a new assistance mode is first created by a user in a first method step 71 or a request is provided that an existing assistance mode is to be modified.

In the following, an analysis of the user's riding behavior is carried out during operation of the bicycle 2. For this purpose, different characteristics of the driving behavior are continuously recorded and analyzed in parallel in a first through fifth analysis step 72 through 76.

In a first analysis step 72, the speed at which the electric bicycle 2 is typically ridden is detected and thus a feel-good speed is determined. If such a feel-good speed is detected, a first adaptation step 77 suggests that a speed recommendation be set to the feel-good speed or that motor assistance be optimized for this speed.

In a second analysis step 73, it is detected whether an abrupt interruption of pedaling occurs during a start-up process. If such behavior is detected, a reduction of a dynamic factor and/or an assistance factor for the assistance mode is suggested in response to this in a second adaptation step 78.

In a third analysis step 74, it is detected whether a very high rider's torque is present when driving, i.e., the rider's torque is above a predefined threshold value. If this is the case, an increase in an assistance factor and a maximum motor torque for the active assistance mode is suggested to the user in a third adjustment step 79. Optionally or additionally, a heart rate of the user is detected in the third adaptation step 79 and an adaptation of the assistance factor and maximum motor torque based on the heart rate is suggested in the third adaptation step 79. For example, if the heart rate is very high, an increase in the assistance factor or the maximum motor torque may be suggested.

In a fourth analysis step 75, it is detected whether a very low rider's torque is present throughout, for example the rider's torque is below a predefined threshold value. If this is the case, a fourth adjustment step 80 is carried out in response. In this fourth adjustment step 80, the user is suggested to reduce the assistance factor and the maximum motor torque.

In a fifth analysis step 76, an environment with high driving resistance is detected. This can be done, for example, by means of a location analysis or a gradient angle. If an environment with high driving resistance is detected, a fifth adaptation step 81 is carried out in response, in which an increase in the assistance factor and the maximum motor torque is suggested.

If one of the adjustment steps 77 through 81 has been carried out, an optional confirmation step 82 suggests that the user adjust the selected assistance mode accordingly or create a new assistance mode. If this is confirmed by the user or if the confirmation step 82 is not executed, the active assistance mode is adapted in a storage step 84 according to the parameters determined in the adaptation steps 77 through 81 or a new assistance mode is created with the parameters determined in the adaptation steps 77 through 81. If the memory request to the user is denied in confirmation step 82, all the settings determined are discarded. This is done in a deletion step 83.

This makes it possible to suggest an assistance mode setting to the user based on the driving style, driving situations and other environmental conditions, preferably also providing a reason for the suggested change. This results in the following advantages: users find it easier to access the possible settings, the adjustable drive parameters and configurable assistance modes become more attractive and more complex assistance modes can be created thanks to intuitive recommendations.

Inexperienced users in particular are not used to driving faster than a certain speed. If sensors detect that the user always stops pedaling at the same speed, this speed can be suggested as a drive parameter for an assistance mode. This can be measured even more clearly downhill: if bicycle 2 is not accelerated above a certain speed, the user's comfort limit can be determined fairly accurately and communicated accordingly.

An assistance factor, the dynamic factor and the maximum motor torque can also be adjusted. Various scenarios can be used to determine whether the motor is set too aggressively or too weakly. Typically, this can be seen when the user pedals, stops pedaling briefly and then continues with a "normal" pedal stroke. In this case, it can be interpreted that the motor assistance was too strong at the beginning and the user therefore stopped pedaling and then pedaled more carefully again. In this case, the start-up may have been too strong and a reduction of the assistance factor and/or the dynamic factor in particular may be recommended. The reduction can be recommended until the driving situation described above no longer occurs.

In some cases, the assistance factor can be adjusted via the speed. In the scenario described, it is conceivable that it is recommended to reduce this assistance factor in the lower speed range.

On the other hand, if very high rider's torques occur when starting off or even while driving, it may make sense to increase the factors described above and possibly also the maximum motor torque.

With light riders, only very low rider's torques occur and the maximum speed is reached very quickly. In this case, there could be an underload and a reduction of the assistance factor is suggested.

In the previous scenarios, a variant is conceivable that includes the heart rate in this assessment. If a healthy or fitness level is regularly exceeded, the rider is probably overstrained with the current setting. In this case, a recommendation is given to increase the assistance factor and the maximum torque. It is also conceivable that an assistance mode could be changed gradually and automatically based on the heart rate if the rider agrees to this.

Finally, the ambient conditions should be considered. If GPS, inertial sensors (acceleration or rotation rate) or the rider's torque are used to detect a change in the surface conditions and therefore, for example, more difficult terrain is to be expected, the user is informed that an increase in the assistance factor is recommended. Especially with GPS, preferably with a known route, the advantage is to estimate how long the underground change will last and whether a recommendation is worthwhile at all. In addition, in the case of a trail, it is particularly recommended that the dynamic factor is reduced in combination with the assistance factor in order to have more control. This is because a very dynamic restart could be unfavorable, if not dangerous.

It is also possible to use GPS/maps (also time-based) to differentiate between work and leisure routes and provide special UDAM location recommendations. It is usually desirable to cover a distance as effortlessly as possible, which is why a high assistance factor and a high maximum motor torque are appropriate here. In leisure time, fitness and range are often of greater interest, so a recommendation that leads to a lower level of assistance is appropriate.

The changes can generally be recommended until the driving situations described above no longer occur or the user does not agree to a further suggestion.

The ambient conditions can be coupled with the previous recommendations. For example, low rider's torques and power are more acceptable on the commute and therefore the threshold values for the recommendations can be more relaxed. If, based on the input signals (e.g., low torque, low speeds, shaky steering angle deflection), a beginner can be assumed, it is recommended to reduce the dynamic factor or the assistance factor in particular.

In principle, it is advantageous if a user can create new assistance modes or modify existing assistance modes. This is possible via the configuration interface 7b.

When creating a new assistance mode, it is necessary to configure the associated drive parameters for this assistance mode, for example a set of drive parameters. If an existing assistance mode is to be modified, the associated drive parameters of this assistance mode must be reconfigured by the user.

Figure 8:
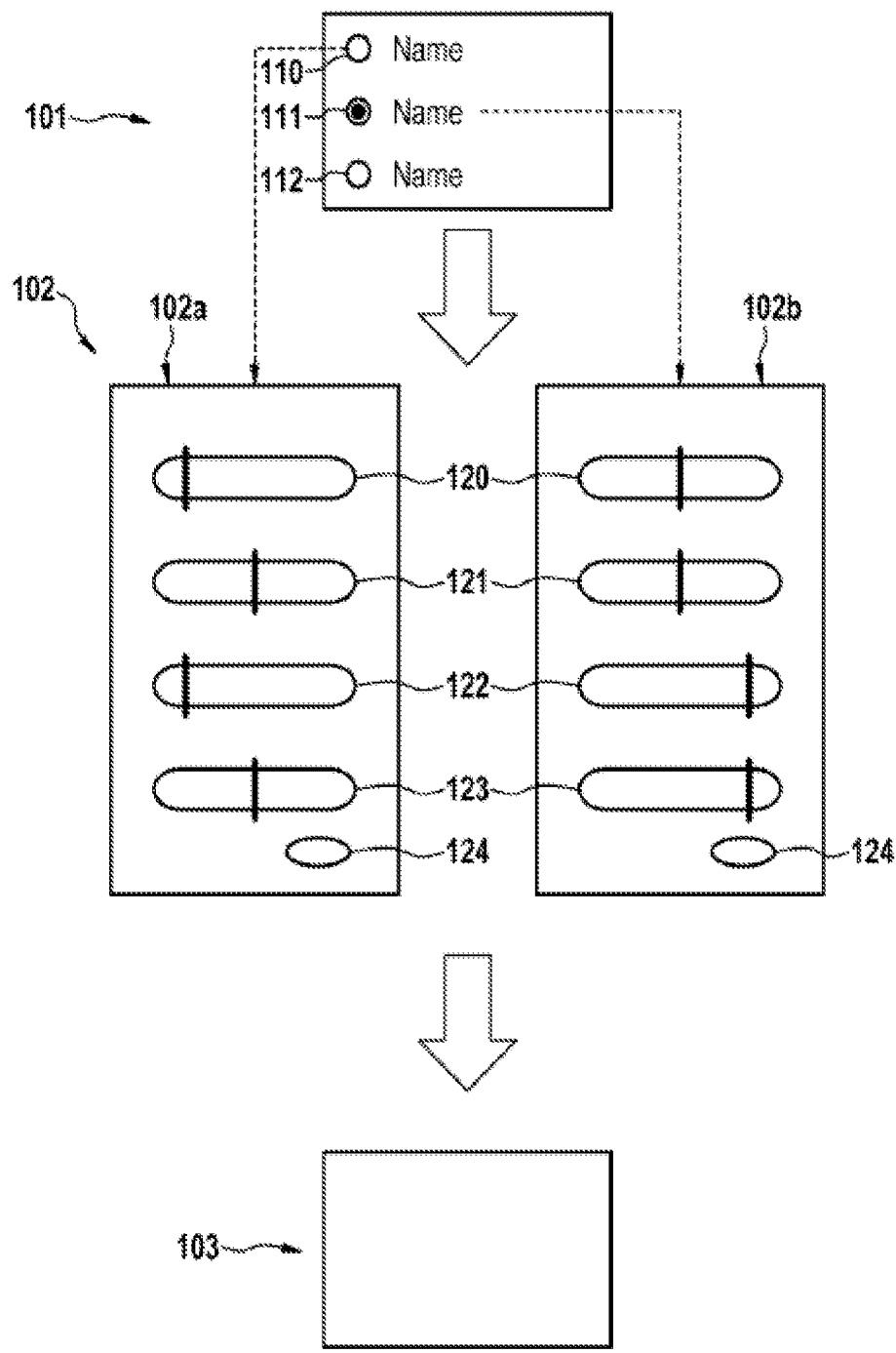
FIG. 8 is a flowchart for a method of creating or customizing drive parameters for an assistance mode using preset profiles.

A method to make it easier for a user to configure a new assistance mode is shown in FIG. 8.

In a first step 101, the user is initially given the opportunity by the configuration interface 7b to select one of several preset profiles 110, 111, 112, which comprise a first preset profile 110, a second preset profile 111 and a third preset profile 112. The available preset profiles 110, 111, 112 are labeled "Cruise", "Commute" and "MTB" as examples in FIG. 8. The names assigned indicate the driving behavior characteristics of the respective preset profile. For example, the preset profile 112, referred to as "MTB", contains drive parameters that result in a riding behavior of the electric bicycle 2 that is particularly suitable for uphill riding. Presettings for drive parameters of an assistance mode are defined by each of the presetting profiles.

For each of the preset profiles 110, 111, 112, presets for drive parameters of an assistance mode are stored.

If a user has selected one of the preset profiles 110, 111, 112, the user is given the option of further modifying the individual drive parameters in a second step 102 via the configuration interface 7b. For example, a plurality of sliders 120-123 are displayed to the user, wherein each of the sliders 120-123 can be used to configure or modify a drive parameter. For example, a first slider 120 is displayed to a user, through which a first drive parameter can be set, a second slider 121 is displayed, through which a second drive parameter can be set, a third slider 122 is displayed, through which a third drive parameter can be set, and a fourth slider 123 is displayed, through which a fourth drive parameter can be set. The position of the slider corresponds to the configuration of the associated drive parameter.

If the user has selected one of the preset profiles 110, 111, 112, the drive parameters for the newly created assistance mode are initially set according to the presettings for drive parameters stored for the selected preset profile 110, 111, 112.

The initial position of the sliders is displayed accordingly.

For example, FIG. 8 shows that the selection of the first preset profile 110 by the user leads to a first configuration 102a of the drive parameters for the newly created assistance mode and that the selection of the second preset profile 111 by the user leads to a second configuration 102b of the drive parameters for the newly created assistance mode. This can be seen from the different positions of sliders 120-123. This means that when a new assistance mode is created, the drive parameters associated with the new assistance mode are set according to the default settings of one of the stored preset profiles.

The user can now carry out a final configuration by moving the sliders in the desired way. The drive parameters set according to the selected presetting profile can therefore be modified by the user. If necessary, the settings can be reset to the default settings associated with the selected preset profile by pressing a reset button 124. Existing assistance modes can also be configured in the same way based on the preset profiles 110, 111, 112. This means that even when drive parameters of an assistance mode to be modified are modified, the drive parameters associated with the assistance mode to be modified are set according to the default settings of one of the stored preset profiles.

Once the final configuration has been carried out, the result is saved and made available in a third step 103 to the ride controller 3. Based on the configured drive parameters, control values are determined which are used to control the drive of the motor 11 of the bicycle 2. The way in which the drive parameters are translated into the control values can depend on calibration values, factory-configurable settings and software properties.

In the example described above, one of the multiple preset profiles is selected based on the selection of a user via the configuration interface 7b. However, this selection can also be made in alternative ways.

Alternatively, one of the several preset profiles is selected based on the category of the electric bicycle. For example, the third preset profile 112 is automatically selected if the electric bicycle 2 is a mountain bike.

Alternatively, one of the several preset profiles is selected based on an active user profile. For example, several users can be configured to use the electric bicycle 2, to which different user profiles are assigned. The preset profile is selected specifically for one of the users based on the user profile currently in use.

Alternatively, one of the multiple preset profiles is selected based on a result of a question and answer dialog, wherein a user is presented with multiple questions and the preset profile is selected based on answers entered by the user. For example, a user's preferences can be determined using the question and answer dialog and the preset profile can be selected based on this.

In any case, the selected preset profile is used to create the new assistance mode and/or to modify the drive parameters.

Pre-setting profiles can be optionally configured via a service interface. For example, a dealer or OEM can define a specific presetting profile that is used by a user during configuration.

In addition to the above written disclosure, explicit reference is made to the disclosure of FIGS. 1 through 8.

The invention claimed is:

1. A control system for an electric bicycle, comprising:
an operating unit configured (i) to control a ride controller of the electric bicycle, (ii) to allow a user to select a selected assistance mode from a plurality of assistance modes via an operating interface, and (iii) to control the ride controller such that a drive control for a motor of the electric bicycle takes place in accordance with the selected assistance mode,
wherein the operating unit is further configured (i) to calculate a key figure for each assistance mode by way of a key figure calculation rule based on drive parameters stored for each respective assistance mode and to carry out a sorting of the assistance modes based on the key figures, or (ii) for each assistance mode, to provide the drive parameters stored for each respective assistance mode via an interface, to receive the key figures via the interface and to perform the sorting of the assistance modes based on the key figures received for the assistance modes,
wherein the key figures are calculated according to the key figure calculation rule from a maximum torque stored for each respective assistance mode and/or an assistance factor stored for each respective assistance mode,
wherein the maximum torque and/or the assistance factor are determined for a common operating point, and
wherein the common operating point is defined by one or more of a cadence, a rider's torque, and a speed.

2. The control system according to claim 1, further comprising:
a configuration interface that allows the user to modify the drive parameters and/or to create new assistance modes.

3. The control system according to claim 2, wherein:
the control system is configured to display an indicator in the operating interface and/or the configuration interface, and the indicator indicates whether an assistance mode of the plurality of assistance modes can be modified by the user.

4. The control system according to claim 2, wherein:
values of the drive parameters for a set of drive parameters are configurable by the user via the configuration interface, and
a number of characteristic values are represented by the configuration interface, each characteristic value describing a behavior of the drive control of the electric bicycle for the values configured for the set of drive parameters.

5. The control system according to claim 4, wherein the characteristic values are displayed as a network diagram via the configuration interface.

6. The control system according to claim 2, wherein;
a plurality of preset profiles are stored,
each of the preset profiles defines presets for the drive parameters of a corresponding assistance mode of the plurality of assistance modes, and
(i) when a new assistance mode is created, the drive parameters associated with the new assistance mode are set in accordance with the presets of one of the stored preset profiles, and/or (ii) when the drive parameters of an assistance mode to be modified are modified, the drive parameters associated with the assistance mode to be modified are set in accordance with the presets of one of the stored preset profiles.

7. The control system according to claim 6, wherein:
a first preset profile of the plurality of preset profiles is selected based on a selection from the user via the configuration interface,
a second preset profile of the plurality of preset profiles is selected based on a category of the electric bicycle,
a third preset profile of the plurality of preset profiles is selected based on an active user profile, and/or
a fourth preset profile of the plurality of preset profiles is selected based on a result of a question and answer dialog,
wherein the user is provided with a plurality of questions and the fourth preset profile is selected based on inputted answers of the user, and
wherein the selected preset profile is used to create the new assistance mode and/or to modify the drive parameters.

8. The control system according to claim 6, wherein one or more preset profiles are configurable via a service interface.

9. The control system according to claim 6, wherein:
a preset profile of the plurality of preset profiles is selected based on a selection from the user via the configuration interface, and
the drive parameters set according to the selected preset profile are subsequently modifiable by the user.

10. The control system according to claim 1, wherein:
each corresponding assistance mode of the plurality of assistance modes is identified by an associated color when displayed via the operating interface,
the operating unit is further configured to calculate a color code describing the associated color for each corresponding assistance mode of the plurality of assistance modes, and
the color code is calculated by way of a color calculation rule from the drive parameters stored for the corresponding assistance mode.

11. The control system according to claim 10, wherein the color code describes a brightness and/or a hue.

12. The control system according to claim 1, wherein:
the operating unit comprises an interface to a configuration platform and is configured to receive and to store several sets of the drive parameters for a first number of assistance modes of the plurality of assistance modes via the interface to the configuration platform,
the operating unit is configured (i) to receive a selection from a user by which a selection of a second number of assistance modes from the first number of assistance modes is made, and (ii) to provide the second number of assistance modes for selection during an operation of the electric bicycle, and
the second number is smaller than the first number.

13. A configuration system, comprising:
the control system according to claim 12,
wherein the configuration platform is configured to:
perform a selection of several assistance modes from a variety of available assistance modes of the plurality of assistance modes to define a pool of assistance modes,
allow the user to select multiple assistance modes from the pool of assistance modes, and
transmit the assistance modes selected from the pool of assistance modes and corresponding drive parameters via the interface to the configuration platform as the first number of assistance modes to the operating unit of the control system.

14. The control system according to claim 1, wherein the operating unit is further configured to:
detect a distance travelled by the user with the electric bicycle, and
to make a specific assistance mode of the plurality of assistance modes available for selection only after a defined minimum distance has been traveled, and/or to remove a limitation when configuring existing assistance modes of the plurality of assistance modes when the defined minimum distance has been traveled.

15. The control system according to claim 1, wherein a mode is provided by the control system in which a limitation of a possible selection of an assistance mode from the plurality of assistance modes is carried out via the operating interface for predefined route sections.

16. The control system according to claim 1, wherein the control system is further configured to perform an automatic change between different selectable assistance modes, so that the drive control after the change is based on a set of drive parameters of the assistance mode to which the change has been made.

17. The control system according to claim 1, wherein the control system is configured to detect a detected driving behavior of the user during operation of the electric bicycle and to adapt the drive parameters based on the detected driving behavior or to create a new drive parameters.

18. The control system according to claim 1, wherein for determining the common operating point, preferred values of the user for the cadence, the rider's torque, and the speed are determined, and/or the common operating point is selected depending on a type of the electric bicycle.

19. A control system for an electric bicycle comprising:
an operating unit configured (i) to control a ride controller of the electric bicycle, (ii) to allow a user to select a selected assistance mode from a plurality of assistance modes via an operating interface, and (iii) to control the ride controller such that a drive control for a motor of the electric bicycle takes place in accordance with the selected assistance mode, wherein corresponding assistance mode of the plurality of assistance modes is identified by an associated color when displayed via the operating interface, wherein the operating unit is further configured to calculate a color code describing the associated color for each corresponding assistance mode of the plurality of assistance modes, wherein the color code is calculated by way of a color calculation rule from drive parameters stored for the corresponding assistance mode, wherein the drive parameters of the corresponding assistance mode are variable, wherein (i) the color code for the corresponding assistance mode is continuously recalculated, the associated color being adapted to the color code when the corresponding assistance mode is displayed via the operating interface, and/or (ii) two color codes are calculated by way of the color calculation rule, which define a first color and a second color, wherein a color change between the first color and the second color is displayed when the corresponding assistance mode is displayed via the operating interface.

20. A control system for an electric bicycle comprising:

an operating unit configured (i) to control a ride controller of the electric bicycle, (ii) to allow a user to select a selected assistance mode from a plurality of assistance modes via an operating interface, and (iii) to control the ride controller such that a drive control for a motor of the electric bicycle takes place in accordance with the selected assistance mode, wherein corresponding assistance mode of the plurality of assistance modes is identified by an associated color when displayed via the operating interface, wherein the operating unit is further configured to calculate a color code describing the associated color for each corresponding assistance mode of the plurality of assistance modes, wherein the color code is calculated by way of a color calculation rule from drive parameters stored for the corresponding assistance mode, wherein the color calculation rule calculates the color code from a maximum torque stored for the corresponding assistance mode and/or an assistance factor stored for the corresponding assistance mode.

* * * * *